3,755,422
PREPARATION OF CAROTENOID COMPOUNDS
Jacques Morel, Choisy-Le-Roi, France, assignor to
Rhone-Poulenc S.A., Paris, France
No Drawing. Filed Jan. 13, 1971, Ser. No. 106,262
Claims priority, application France, Jan. 15, 1970,
700,415
Int. Cl. C07c 67/04
U.S. Cl. 260—497 R                6 Claims

ABSTRACT OF THE DISCLOSURE

Isozeaxanthine and its saturated aliphatic monocarboxylic acid esters, useful as carotenoid pigments, are made by the action of iodine, in the presence of a said acid and an organic base, on retrodehydro-β-carotene, followed, if desired by saponification of the ester produced.

---

The present invention relates to the preparation of isozeaxanthine or 4,4′-dihydroxy-β-carotene, and its esters. These compounds are carotenoid pigments which are used to colour foods, or can be used in the preparation of other pigments for foods, such as canthaxanthine.

It is known to prepare isozeaxanthine from compounds derived from vitamin A, itself synthesised from β-ionone [Helv. Chim. Acta, 39, 449 (1956)], but this involves syntheses comprising numerous stages. A process which has the advantage of using a natural product as the starting material consists of treating β-carotene with a bromination agent such as N-bromosuccinimide, and with acetic acid and an alkaline organic agent, and then saponifying the 4,4′-dihydroxy-β-carotene diester obtained [Helv. Chim. Acta, 41, 402 (1958)]. However, the bromination requires low temperatures and must be carried out carefully, which is difficult in large scale manufacture.

The present invention provides a process for preparing 4,4′-dihydroxy-β-carotene and its esters with saturated aliphatic monocarboxylic acids which comprises reacting retrodehydro-β-carotene with iodine in the presence of a saturated aliphatic monocarboxylic acid and an alkaline organic reagent, and then, if desired, saponifying the 4,4′-dihydroxy-β-carotene ester thus obtained to liberate 4,4′-dihydroxy-β-carotene.

By way of example, the diacetate formed when the said aliphatic acid is acetic acid is isozeaxanthine diacetate of formula:

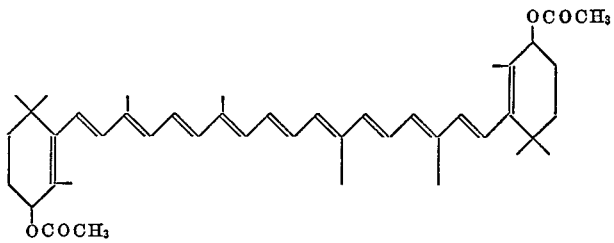

The retrodehydro-β-carotene used as starting material can be obtained by various methods from vitamin A and its derivatives. It can also be prepared more simply from β-carotene, by the process described in U.S. Ser. No. 3,208, filed Jan. 15, 1970. This process consists of reacting β-carotene with N-bromosuccinimide, and then dehydrobrominating the brominated derivative obtained, in the presence of an alkali metal iodide and an alkali metal thiosulphate.

The proportion of iodine employed in the process of the invention is preferably one mole per mole of retrodehydro-β-carotene treated. The molar proportion of the organic base is preferably at least equal to that of the iodine, but an excess is not disadvantageous. This organic base is preferably a tertiary aliphatic, aromatic or heterocyclic amine, such as the trialkylamines, the N,N′-dialkylanilines, pyridine and its homologues, the N-alkylpiperidines, the N-alkylmorpholines, and the like. (By "alkyl" is meant preferably alkyl of up to 6 carbon atoms.)

In general, the saturated carboxylic acid is used in a proportion which is at least stoichiometric (i.e. at least 2 moles per mole of retrodehydro-β-carotene). When it is desired to prepare isozeaxanthine itself, acetic acid is very suitable, since it is easily removed following the saponification. Any other saturated aliphatic monocarboxylic acid, e.g. alkanoic acid of up to 10 carbon atoms, can, however, be used. An excess of acid is not disadvantageous.

The reaction may be carried out in a solvent for the isozeaxanthine, for example a chlorinated solvent such as chloroform, a benzene hydrocarbon, dimethylformamide, acetone, acetonitrile, nitrobenzene, or any other solvent which is inert under the reaction conditions.

The temperature at which the reaction is carried out is generally between −5° and +35° C.

When the formation of the diester is complete, the product obtained can be isolated from the reaction mass and purified by customary methods, or can be saponified to liberate isozeaxanthine, e.g. with an inorganic alkaline agent, such as sodium or potassium hydroxide.

The following example illustrates the invention.

EXAMPLE 0.200 g. of retrodehydro-β-carotene and 200 cm.³ of chloroform are introduced into a 500 cm.³ flask provided with a stirring system, a reflux condenser and an inlet for nitrogen. The flask is cooled to 0° C. and 4 cm.³ of acetic acid and 1.60 g. of N-ethylmorpholine are added, followed by 19.2 cm.³ of an 0.5% strength by weight, per volume, solution of iodine in chloroform. After stirring at 0° C. for one hour 45 minutes, the reaction mass is washed successively with 100 cm.³ of water, 100 cm.³ of a 2% strength aqueous solution of sulphuric acid and 100 cm.³ of a 5% strength aqueous solution of sodium carbonate. The chloroform solution is dried over anhydrous sodium carbonate and then concentrated to dryness under reduced pressure (20 mm. of mercury) at a temperature of 40° C. The residue thus obtained is taken up in 4.8 cm.³ of benzene. 40 cm.³ of a 15% strength solution of potassium hydroxide in methanol are added to the solution obtained, which is stirred for 1 hour at 50° C. After cooling, followed by the addition of 100 cm.³ of water and 20 cm.³ of chloroform, the chloroform layer is decanted and dried over anhydrous sodium carbonate. The chloroform is then evaporated and the residue is taken up in 3 cm.³ of propionitrile. A solution is obtained by heating in a waterbath, and is left for 48 hours in the refrigerator. The crystallised product is filtered off on a glass frit, washed 5 times with 1 cm.³ portions of methanol, and dried at 25° C. under reduced pressure (20 mm. of mercury). 0.1 g. of a crystalline product is thus obtained, which is red and melts at 170°

C. (Kofler bench), and shows in U.V. spectrography, in solution in ethanol, an absorption maximum at 450 nm.

$$(E_{1cm}^{1\%} = 215)$$

Isozeaxanthine is thus obtained pure, in a yield of 47% of theory.

I claim:

1. Process which comprises reacting retrodehydro-β-carotene with iodine, in the presence of a saturated aliphatic monocarboxylic acid and a tertiary amine, to produce a 4,4'-dihydroxy-β-carotene ester.

2. Process according to claim 1 in which the said acid contains up to 10 carbon atoms.

3. Process according to claim 1 in which one mole of iodine, at least one mole of tertiary amine, and at least two moles of the said acid are used for each mole of retrodehydro-β-carotene.

4. Process according to claim 1 in which the tertiary amine is a trialkylamine, an N,N-dialkylaniline, pyridine or a homologue thereof, an N-alkyl-piperidine, or an N-alkyl-morpholine.

5. Process according to claim 1 in which the reaction is carried out at −5° to +35° C.

6. Process according to claim 1 in which the said ester is saponified to produce 4,4'-dihydroxy-β-carotene.

References Cited

UNITED STATES PATENTS

| | | | |
|---|---|---|---|
| 2,576,104 | 11/1951 | Shantz et al. | 260—617 A |
| 3,004,063 | 10/1961 | Entschel et al. | 260—617 B |
| 3,384,633 | 5/1968 | Kardys | 260—488 A |

OTHER REFERENCES

Entschel et al.: Carotenoid Synthesis XXIII, Helva Acta Chim. 41, pp. 402–13 (1958).

Bodea et al.: Acad. Rep. Popular Ronine, 12, No. 1, pp. 153–7 (1961).

LORRAINE A. WEINBERGER, Primary Examiner

R. D. KELLY, Assistant Examiner

U.S. Cl. X.R.

260—488 A, 617 B, 410.9 R

UNITED STATES PATENT OFFICE
CERTIFICATE OF CORRECTION

Patent No. 3,755,422          Dated August 28, 1973

Inventor(s) Jacques MOREL

It is certified that error appears in the above-identified patent and that said Letters Patent are hereby corrected as shown below:

In the Claim for Convention Priority, the number of the French priority document is incorrect and should be corrected to read:

--France, Appln. No. 70.01415 filed January 15, 1970--.

Signed and sealed this 2nd day of April 1974.

(SEAL)
Attest:

EDWARD M. FLETCHER, JR.　　　　　　　　C. MARSHALL DANN
Attesting Officer　　　　　　　　　　　Commissioner of Patents